M. HANSEN.
MACHINE FOR GROOVING LENSES.
APPLICATION FILED MAY 5, 1914.

1,145,194.

Patented July 6, 1915.
2 SHEETS—SHEET 1.

Attest:

Inventor:

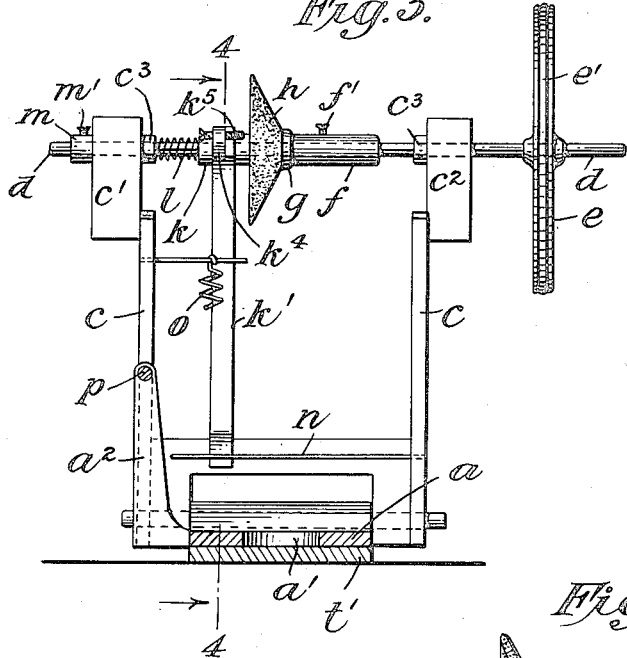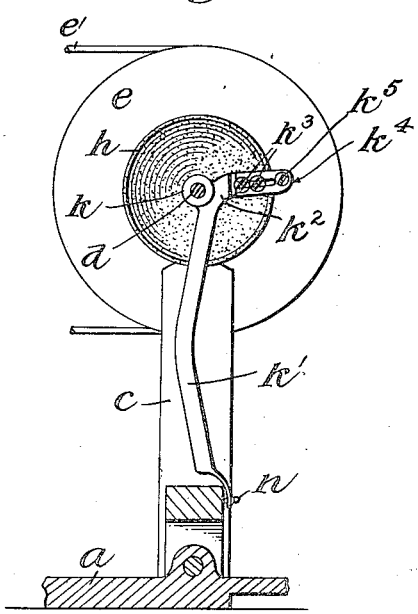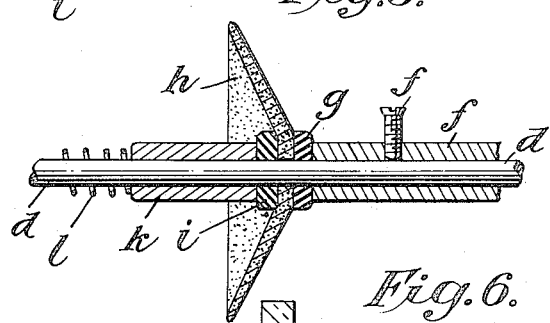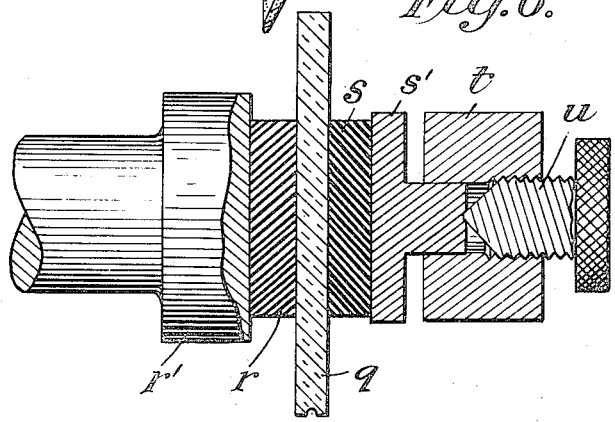

UNITED STATES PATENT OFFICE.

MARINIUS HANSEN, OF NEW YORK, N. Y.

MACHINE FOR GROOVING LENSES.

1,145,194.   Specification of Letters Patent.   Patented July 6, 1915.

Application filed May 5, 1914. Serial No. 836,421.

*To all whom it may concern:*

Be it known that I, MARINIUS HANSEN, a subject of the King of Norway, residing in the borough of Brooklyn of the city of New York, in the State of New York, have invented certain new and useful Improvements in Machines for Grooving Lenses, of which the following is a specification, reference being had to the accompanying drawings, forming a part hereof.

This invention relates to machines for grooving lenses and particularly lenses for eyeglasses.

It has formerly been the practice to mount the lenses of eyeglasses either directly upon the nose piece or, in the case of spectacles, by supports both upon the nose piece and at the outer sides of the lenses. In accordance with the method of mounting disclosed in U. S. Patent No. 1,055,904, dated March 11, 1913, and issued to the present applicant, the lenses are supported by wires completely encircling the edges and resting in grooves formed therein.

The present invention has for its object to provide a simple machine by which the grooves for the reception of such supporting wires may be readily and accurately cut in the edges of lenses without fracturing the same.

A further object is to provide in a machine of this character means to guide the cutter along the edge of the lens so as to form a groove which is accurate throughout the entire periphery of the lens and is at a fixed distance from the faces thereof regardless of the curvature of the lens.

A further object is to construct such a grooving machine which shall be inexpensive to manufacture and convenient to adjust in operative relation to the lens to be grooved and adapted to coöperate with the usual edging machines or bench lathes now in common use by opticians.

Reference is now to be had to the accompanying drawings for a detailed description of the invention, in which—

Figure 1:
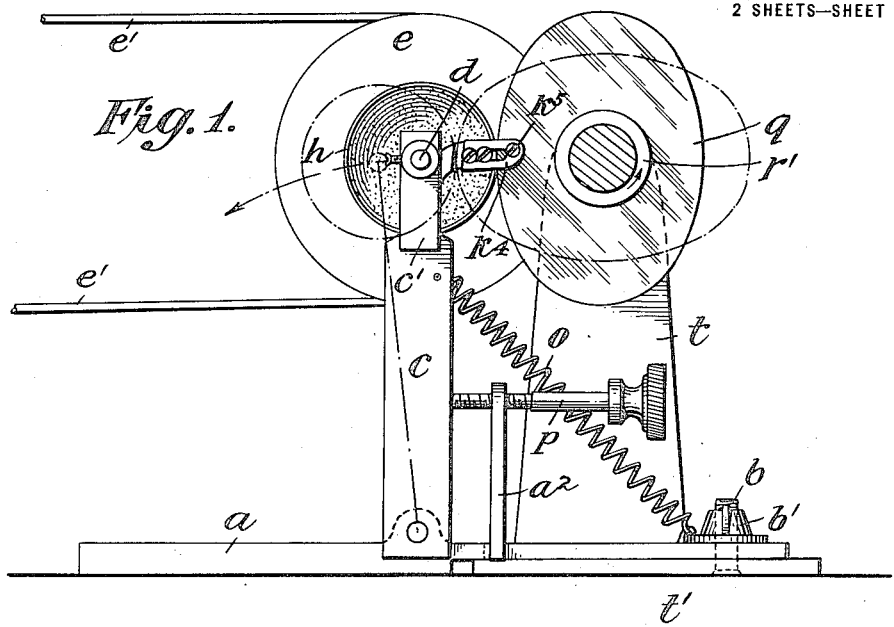
Figure 2:
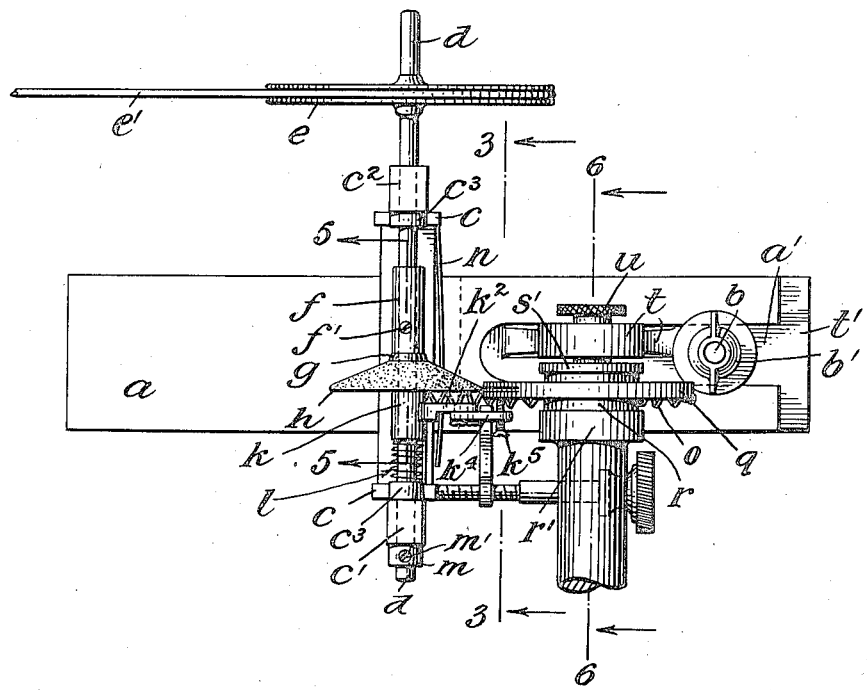

Figure 1 is a view in side elevation of the improved grooving machine and showing a lens mounted in operative relation with respect thereto, the actuating shaft of the lens support being shown in section. Fig. 2 is a plan view of the mechanism shown in Fig. 1. Fig. 3 is a view partly in section taken on the plane indicated by the line 3—3 of Fig. 2 and looking in the direction of the arrows. Fig. 4 is a view partly in section taken on the plane indicated by the line 4—4 of Fig. 3 and looking in the direction of the arrows, the centering arm for the lens being shown prominently. Fig. 5 is a sectional view taken on the plane indicated by the line 5—5 of Fig. 2 and looking in the direction of the arrows. Fig. 6 is a detail view on a somewhat larger scale taken on the plane indicated by the line 6—6 of Fig. 2 and looking in the direction of the arrows, and showing particularly the method of supporting the rotating lens.

The construction of the improved machine will be first described in detail and the relationship thereof to suitable supporting and rotating means for the lens and the operation of the entire mechanism will then be pointed out. The grooving mechanism includes a suitable base $a$ having a slot $a'$ therein within which may rest a stub $b$ and thumb nut $b'$ to permit the base $a$ and the grooving mechanism to be secured adjustably to the bench of the workman, so that the initial position of the cutter with respect to the lens may be determined. To the base $a$ is hingedly secured a vertical standard $c$ which is provided adjacent its upper end with suitable bearings $c'$, $c^2$ in which is rotatably mounted the cutter shaft $d$ and with which coöperate suitable caps $c^3$ to prevent the entrance of dust and other foreign particles into the bearings. The shaft $d$ has fixed thereon a suitable driving pulley $e$ which may derive its power through a band $e'$ connected operatively with any available prime mover. On the shaft $d$ between the bearings $c'$, $c^2$ is detachably secured a sleeve $f$, as by a set screw $f'$, to the end of which is fixed a rubber or frictional washer $g$ against which abuts a suitable carborundum or other suitable cutting wheel $h$, the wheel being held in fixed position with respect to the shaft $d$ by means of a second frictional washer $i$ which is pressed against its other face by a sleeve $k$ and spiral spring $l$, the latter being conveniently seated on one of the dust proof rings $c^3$. Movement of the shaft $d$ to the right, as viewed in Fig. 3, is limited by means of a collar $m$ adjustably secured to the shaft by a set screw $m'$, such an arrangement permitting the tension of the spring $l$ to be adjusted. It is to be noted that the sleeve $k$ is loosely mounted on the shaft $d$ and has a downwardly projecting arm $k'$ with which engages a suitable wire spring $n$ secured to the frame $c$ of the machine. The sleeve $k$ has also formed integral therewith or secured thereto a slotted finger $k^2$ to which may be secured adjustably through suitable studs $k^3$ a centering finger $k^4$ carrying adjacent its free end a threaded stud $k^5$, the inner end of which, during the grooving of the lens, is in engagement with one of the side faces thereof to determine the position of the cutting edge of the disk $h$ with respect to the faces of the lens. For convenience in terminology the finger $k^4$ with its associated parts will be termed hereinafter the centering finger of the lens although it is quite evident that the cutter may be either centered with respect to the faces of the lens or may traverse the periphery of the lens to one side or the other of the center line. In connection with the centering finger $k^4$ it will be observed that the spring $n$, coöperating with the downwardly extending arm $k'$, serves to keep the said finger in substantially a horizontal position at all times and furthermore that if unexpected vibrations of any part of the mechanism cause the finger $k^4$ to spring upwardly, the spring $n$ will permit such spring movement and will subsequently return the finger to its operative position after such vibrations have ceased.

In pointing out the operation of the machine hereinafter it will become evident that it is desirable to press the cutter into yielding engagement with the edge of the lens to be grooved and for this purpose the supporting frame $c$ is pivotally mounted on the base $a$ and is normally held in substantially vertical position by means of a suitable spring $o$ which, in the present embodiment, has one end anchored in the thumb nut $b'$ and the other end secured to the supporting standard, the pull of the spring tending at all times to draw the cutting disk $h$ into engagement with the lens. This movement of the frame $c$, however may be limited by an adjustable, threaded stud $p$ passing through a suitable bracket $a^2$ formed integral with or mounted on the base $a$.

In grooving lenses with the improved machine it is necessary only that suitable means be employed to support the lens rotatably. In practice, the ordinary bench lathe of the optician or the usual edging machine will serve this purpose and as indicated in Figs. 2 and 6 the lens $q$ may be mounted between a rubber or frictional disk $r$ carried on the usual chuck $r'$ of a bench lathe, and a second rubber or frictional disk $s$ carried on the head stock $s'$ which is mounted rotatably in a suitable standard $t$ and adjustable by means of a threaded stud $u$ in operative engagement therewith. The standard $t$ is provided with a base plate $t'$ which carries the stud $b$ by which the base $a$ of the cutting machine is secured adjustably in position.

In operation, after the lens $q$ is clamped in position between the frictional washers $r$ and $s$ which, it is to be observed, need not be co-axial therewith, the base $a$ is moved with respect to the base $t$ until the cutting edge of the wheel $h$ is in engagement with the lens. The stud $p$ may then be rotated to adjust the tension of the spring $o$ for this initial position of the cutting wheel $h$, the collar $m$ may be moved axially along the shaft $d$ to determine the effective tension of the spring $l$ and the threaded stud $k^5$ is moved to determine the line of grooving with respect to the faces of the lens. The lens $q$ is then rotated counter-clockwise while the cutting wheel $h$ is rotated in the opposite direction and at a far higher speed, the result being that the lens is grooved evenly throughout its periphery. As the line of cutting progresses due to the rotation of the lens it will be understood that the standard $c$ through the spring $o$ moves in one direction or the other to permit the cutting wheel to conform to the contour of the lens.

From the description given, it will be evident that there is provided for the cutting wheel $h$ spring compensation for both lateral and axial movement so that the wheel will, at all times, follow truly the edge of the lens and cut therein a groove which is a fixed distance throughout from the faces of the lens. It will also be observed that by means of the construction employed the collar $m$ may be removed and the shaft $d$ entirely withdrawn, thus permitting the cutting wheels $h$ to be interchanged as may be necessary, this assembling and disassembling of parts being very readily effected by the optician.

As pointed out before this invention is not to be limited to the means for supporting and rotating the lens nor is it to be limited to the precise embodiment of the cutting machine, as modifications in the construction of the constituent elements and rearrangements thereof will be apparent to those skilled in the art.

I claim as my invention:

1. A machine for grooving lenses comprising a supporting frame, a circular cutter mounted rotatably thereon, adjustable means carried by the frame to maintain automatically the edge of the cutter at a fixed distance from the faces of the lens to be grooved whereby the groove is formed parallel to the faces and means to hold the cutter yieldingly in operative engagement with the edge of the lens.

2. A machine for grooving lenses comprising a supporting frame, a rotatable cutter mounted thereon, an adjustable arm in fixed relationship to the cutter and adapted to engage the face of the lens to position the cutting edge with respect thereto and a spring in operative engagement with the arm to hold the same yieldingly in position.

3. A machine for grooving lenses comprising a base, a supporting frame hingedly secured thereto, a rotatable cutter mounted on the frame, means carried on the frame to position the cutting edge with respect to the faces of the lens to be grooved, a spring to hold said means yieldingly in operative position to compensate for irregularities in the faces of the lens and a second spring in operative engagement with said hinged frame to press the edge of the cutter in yielding engagement with the edge of the lens to compensate for irregularities in the contour thereof.

4. A machine for grooving lenses comprising a base, a supporting frame hingedly secured thereto, a circular cutter mounted on the shaft, an adjustable arm carried in fixed relationship to the cutter and adapted to engage one of the faces of the lens to position the cutting edge with respect thereto, a spring in operative engagement with said arm to prevent rotation thereof about its axis, a second spring in operative engagement with said arm to hold the same yieldingly in fixed relationship to the cutter and to permit a yielding lateral movement thereof, a third spring in operative engagement with the hinged frame to hold the cutter in yielding engagement with the edge of the lens and an adjustable screw coöperating with the frame to adjust the tension of said last named spring.

This specification signed and witnessed this fourth day of May A. D. 1914.

MARINIUS HANSEN.

Signed in the presence of—
ELLEN J. KRUGER,
WORTHINGTON CAMPBELL.